US012473189B2

(12) United States Patent
Victor et al.

(10) Patent No.: US 12,473,189 B2
(45) Date of Patent: Nov. 18, 2025

(54) WATER DISPENSING TABLE LAMP

(71) Applicant: HID SIPS LIMITED LIABILITY COMPANY, Austin, TX (US)

(72) Inventors: Daniel Victor, Austin, TX (US); Austin Malm, San Diego, CA (US)

(73) Assignee: HID SIPS LIMITED MIABILITY COMPANY, Austin, TX (US)

( * ) Notice: Subject to any disclaimer, the term of this patent is extended or adjusted under 35 U.S.C. 154(b) by 142 days.

(21) Appl. No.: 18/169,040

(22) Filed: Feb. 14, 2023

(65) Prior Publication Data

US 2023/0257251 A1 Aug. 17, 2023

Related U.S. Application Data

(60) Provisional application No. 63/268,077, filed on Feb. 16, 2022.

(51) Int. Cl.
*B67D 1/08* (2006.01)
*B67D 1/00* (2006.01)
(Continued)

(52) U.S. Cl.
CPC ......... *B67D 1/0875* (2013.01); *B67D 1/0003* (2013.01); *B67D 1/0888* (2013.01);
(Continued)

(58) Field of Classification Search
CPC .. B67D 1/0875; B67D 1/0003; B67D 1/0888; B67D 2210/00031; F21S 6/002; F21Y 2103/10; F21Y 2115/10
See application file for complete search history.

(56) References Cited

U.S. PATENT DOCUMENTS

2002/0113022 A1 8/2002 Gadgil et al.
2005/0044871 A1 3/2005 Nowak
(Continued)

FOREIGN PATENT DOCUMENTS

CN 107928321 A 4/2018
CN 207702217 U 8/2018
(Continued)

OTHER PUBLICATIONS

Goinkegnito, Inkegnito Kegerator System Discreet and Stylish, Etsy.com, accessed Nov. 10, 2022, https://www.etsy.com/listing/833213041/inkegnito-kegerator-system-discreet-and?utm_source=OpenGraph&utm_medium=PageTools&utm_campaign=Share.
(Continued)

*Primary Examiner* — Abdulmajeed Aziz
*Assistant Examiner* — Jessica M Apenteng
(74) *Attorney, Agent, or Firm* — Thompson Patent Law Offices

(57) ABSTRACT

Apparatus and associated methods relate to a water dispensing lamp (WDL). In an illustrative example, the WDL may include a base module disposed on a horizontal plane, and a fluid dispensing stem coupled above the horizontal plane along a vertical axis. The fluid dispensing stem, for example, may include an electrical pump and a dispensing element. For example, the electrical pump may be configured to pump fluid out of the dispensing element towards the base module. In some implementations, the WDL may include a lamp shade coupled to the fluid dispensing stem. Various embodiments may advantageously conceal the dispensing element by the lamp shade unless a viewing angle between the horizontal plane and a viewing axis is larger than a predetermined viewing angle threshold.

20 Claims, 10 Drawing Sheets

(51) Int. Cl.
*F21S 6/00* (2006.01)
*F21Y 103/10* (2016.01)
*F21Y 115/10* (2016.01)

(52) U.S. Cl.
CPC .... *F21S 6/002* (2013.01); *B67D 2210/00031* (2013.01); *F21Y 2103/10* (2016.08); *F21Y 2115/10* (2016.08)

(56) References Cited

U.S. PATENT DOCUMENTS

| | | | | |
|---|---|---|---|---|
| 2006/0151715 | A1 | 7/2006 | Greene | |
| 2020/0085007 | A1 | 3/2020 | Youn et al. | |
| 2021/0323805 | A1 * | 10/2021 | OHara | B67D 1/06 |

FOREIGN PATENT DOCUMENTS

| | | | |
|---|---|---|---|
| CN | 108870162 | A | 11/2018 |
| CN | 208138961 | U | 11/2018 |
| CN | 111828893 | A | 10/2020 |
| CN | 212480973 | U | 2/2021 |
| CN | 214127970 | U | 9/2021 |
| CN | 215993649 | U | 3/2022 |
| CN | 216280827 | U | 4/2022 |
| CN | 217185864 | U | 8/2022 |

OTHER PUBLICATIONS

Humidrop, Anti-gravity Humidifier, accessed Jan. 24, 2023, https://humidrop.com/products/anti-gravity-humidifier-water-droplet-backflow-aromatherapy-machine-large-capacity-office-bedroom-silent-large-fog-volume-spray.

LampsUSA, LampsUSA Slip UNO Harp Adapter SlipUnoPB, accessed Nov. 10, 2022, https://www.lampsusa.com/products/0-001164-brass-slip-uno-adapter-convert-your-uno-lamp-to-accept-a-harp-and-finial-6h.

The Local Vault, Antique Ragged School Water Dispenser Spigot Converted Lamp | The Local Vault, accessed Nov. 10, 2022, https://thelocalvault.com/product/antique-ragged-school-water-dispenser-with-spigot-converted-lamp/.

* cited by examiner

WATER DISPENSING TABLE LAMP

CROSS-REFERENCE TO RELATED APPLICATIONS

This application also claims the benefit of U.S. Provisional Application Ser. No. 63/268,077, titled "Water Dispensing Table Lamp," filed by Daniel Victor, on Feb. 16, 2022.

This application incorporates the entire contents of the foregoing application(s) herein by reference.

TECHNICAL FIELD

Various embodiments relate generally to water dispensing illumination systems.

BACKGROUND

A bedside lamp, for example, may be a light fixture that is placed alongside a bed in a bedroom. For example, the bedside lamp may include a light bulb used for illuminating a space near the bedside lamp. For example, the illumination may sometimes be limited so that a partner sleeping nearby will not be disturbed by the lamp.

In some examples, the bedside lamp may include a lampshade that envelopes the lightbulb to diffuse the light it emits. For example, a lampshade may be made of paper, glass, fabric, metal, or stone. In some examples, a lampshade may also be used as a decorative or an aesthetic feature. A lampshade may sometimes shade human eyes from part of the bedside lamp (e.g., from a direct radiation from a light bulb of the lamp).

A lampshade sometimes may be coupled to a lamp using a fitter. For example, a spider fitter that may be set on top of a lamp harp and secured with a finial may be used. For example, the spider fitter may be built into the lampshade and sits on top of a lamp harp. Other fitters may include clip-on fitters, Uno fitters that may be attached to the lamp itself below a light bulb, and notched-bowl fitters that may support usage of a glass reflector bowl.

SUMMARY

Apparatus and associated methods relate to a water dispensing lamp (WDL). In an illustrative example, the WDL may include a base module disposed on a horizontal plane, and a fluid dispensing stem coupled above the horizontal plane along a vertical axis. The fluid dispensing stem, for example, may include an electrical pump and a dispensing element. For example, the electrical pump may be configured to pump fluid out of the dispensing element towards the base module. In some implementations, the WDL may include a lamp shade coupled to the fluid dispensing stem. Various embodiments may advantageously conceal the dispensing element by the lamp shade unless a viewing angle between the horizontal plane and a viewing axis is larger than a predetermined viewing angle threshold.

Various embodiments may achieve one or more advantages. For example, some embodiments may advantageously include fitting elements to fit an UNO fitting of a lampshade. Some embodiments, for example, may advantageously prevent fluid from damaging electronics of the WDL. For example, some embodiments may advantageously include a spill tray to catch fluid spilled from the fluid dispensing stem. Some embodiments may, for example, advantageously include quick release between the fluid dispensing stem and a supporting stem of the WDL. For example, some embodiments may advantageously include a visual indicia for alerting a dispensing operation in progress.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a water dispensing lamp (WDL) is introduced with reference to FIGS. 1A-1B. Second, that introduction leads into a description with reference to FIGS. 2-4B of some exemplary embodiments of a base of the WDL. Third, with reference to FIG. 5, a control system is described in application to exemplary WDL. Fourth, with reference to FIGS. 6A-7B, the discussion turns to exemplary embodiments that illustrate various features and embodiments of a stem of the WDL. Fifth, and with reference to FIG. 8, this document describes exemplary apparatus and methods useful for filtering water for the WDL. Finally, the document discusses further embodiments, exemplary applications and aspects relating to bedside water lamps.

Figure 1A:
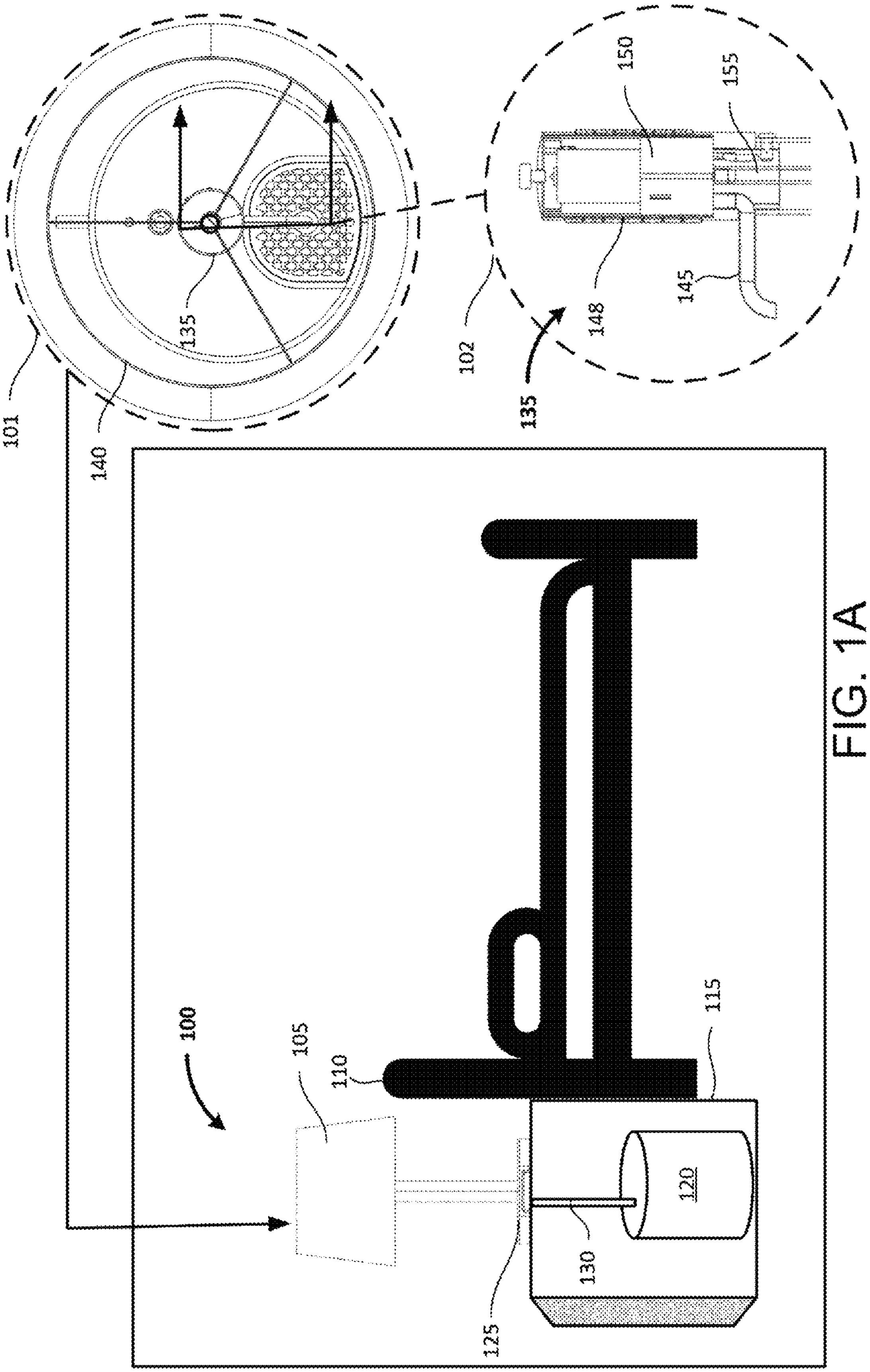
FIG. 1A and FIG. 1B depict an exemplary water dispensing lamp (WDL) employed in an illustrative use-case scenario.
Figure 1B:
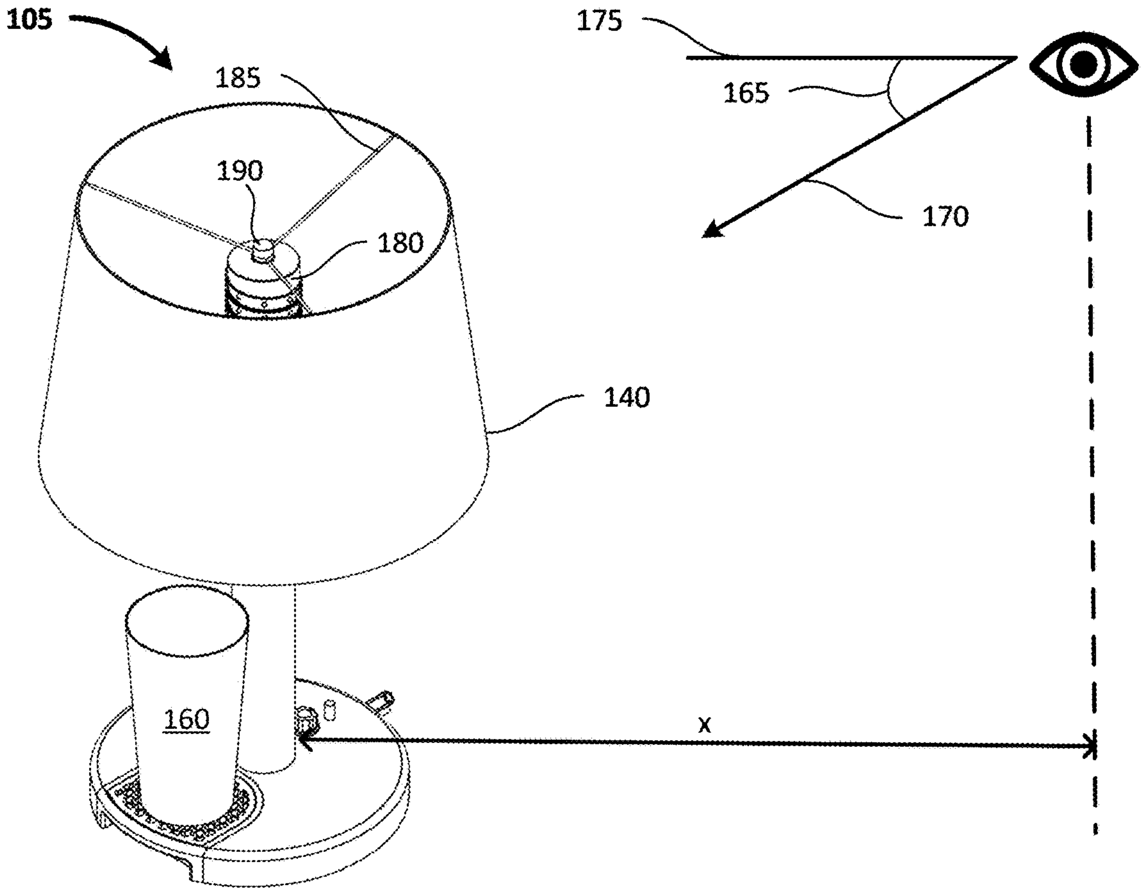

FIG. 1A and FIG. 1B depict an exemplary water dispensing lamp (WDL) employed in an illustrative use-case scenario. In an exemplary bedroom 100 shown in FIG. 1A, a WDL 105 is placed beside a bed 110. For example, the WDL 105 may be used as a bedside lamp. As shown, the WDL 105 may be placed on a cabinet 115. The WDL 105, for example, may dispense water received from a water reservoir 120. For example, the water reservoir 120 may be a container. For example, the water reservoir 120 may be a temperature controlled container (e.g., a fridge). In this example, the water reservoir 120 is stored within the cabinet 115. In some implementations, the water reservoir 120 may be a container placed on a top of the cabinet 115. In some implementations, the water reservoir 120 may be coupled to the WDL 105 above a lamp base 125 of the WDL 105. In this example, the water reservoir 120 is coupled to the WDL 105 via a fluid conduit 130. In some implementations, the fluid conduit 130 may be flexible. For example, the fluid conduit 130 may advantageously allow an optimal discretion to flexibly run outside of the WDL 105 to maintain, for example, a clean look of the bedroom 100.

The WDL 105, as shown in a top view diagram 101 in FIG. 1A, includes a water dispensing module 135, and a lamp shade 140. For example, the water dispensing module 135 may be concealed by the lamp shade 140. In some examples, the lamp shade 140 may advantageously hide various dispensing components from a range of viewing angles for aesthetic purposes.

In this example, some components of the water dispensing module 135 are shown in a cross-section diagram 102. The water dispensing module 135 includes a dispensing spout 145 and a LED module 148 (e.g., a LED light strip). For example, the dispensing spout 145 may be a stainless steel spout. For example, the dispensing spout 145 may be a copper spout. For example, the dispensing spout 145 may be a PCB spout with coated color(s). As shown, the dispensing spout 145 is connected to an electric pump 150. In some implementations, the electric pump 150 is connected to the dispensing spout 145 by a spout fastener. As shown, the electric pump 150 is connected to a fluid conduit 155. For example, the fluid conduit 155 may be coupled to the fluid conduit 130. For example, the electric pump 150 may be actuated to dispense water from the water reservoir 120 to the dispensing spout 145.

The LED module 148, for example, may wrap helically around the water dispensing module 135. For example, the LED module 148 may be selectively powered by a user of the WDL 105. In some implementations, the LED module 148 may advantageously provide illumination for the WDL 105 to serve as a lighting fixture to the airspace surrounding the WDL 105.

As an illustrative example as shown in FIG. 1B, a user may place a cup 160 on the lamp base 125 to receive fluid (e.g., water) pumped out of the water dispensing module 135. As shown, the lamp shade 140 may be configured to cover the dispensing spout 145 and other water dispensing components (e.g., fasteners, electronic component, fluid actuation components) from view.

In this example, a user may be viewing at a viewing angle 165. The viewing angle 165 is the angle between a horizontal plane 170 of the lamp base 125 and a viewing axis 175 of the user. For example, the viewing axis 175 may be at a predetermined distance x from the center of the lamp base 125. For example, the predetermined distance may be 20 cm. For example, the predetermined distance may be 35 cm. For example, to see the dispensing spout 145, the viewing angle 165 may have to be larger than a predetermined viewing angle defined by a length and a height of the lamp base 125. In some implementations, the viewing angle 165 may be at least 75° to view the dispensing spout 145. In some implementations, the viewing angle 165 may be at least 80° to view the dispensing spout 145. In some implementations, the viewing angle 165 may be at least 85° to view the dispensing spout 145.

In some implementations, the lamp shade 140 may be releasably coupled to a housing 180 of the water dispensing module 135 via a ring type fitting 185 (e.g., a UNO fitting, a harp fitting). For example, the housing 180 may include a coupling element 190 configured to receive the ring type fitting 185. Exemplary fittings for coupling the lamp shade 140 to the water dispensing module 135 are described with reference to FIGS. 5A-6B.

In various examples, the WDL 105 may include the lamp base 125 and a water dispensing module 135 coupled above the lamp base 125 along a vertical axis. For example, the water dispensing module 135 may include an electrical pump (e.g., the electric pump 150) and a dispensing element (e.g., dispensing spout 145). For example, the electrical pump may be configured to pump fluid out of the dispensing element towards the lamp base 125. For example, the WDL 105 may further include a lamp shade (the lamp shade 140) releasably coupled to the water dispensing module 135 so that the lamp shade covers dispensing components of the water dispensing module 135 above a predetermined viewing angle. For example, accordingly, a water dispensing function of the WDL 105 may advantageously be discrete from guests without knowledge of, for example, a water demand of the user during bedtime.

As an illustrative example, the WDL 105 may advantageously encourage hydration in situations where people may otherwise opt to falling back asleep rather than addressing their thirst or dry mouth. In some examples, a user may have taken a medicine or a prescription drug. For example, the medication may have a side effect of dehydration so that the user may feel thirsty in sleep. For example, the user may want to hide the fact that he/she may have a need to take medication in the middle of the night. In some examples, the WDL 105 may advantageously avoid the user to unnecessarily disclose their sleeping habits and/or underlying sickness (e.g., diabetes, sleep apnea, menopause, allergies) while providing enough lighting to serve as a lighting fixture to the airspace surrounding the WDL 105. The WDL 105 may, for example, advantageously provide hidden water dispensing features without manipulation of the lamp (e.g., rotating it, opening cabinets, moving objects).

In some implementations, the water dispensing module 135 may include a housing (e.g., the housing 180). For example, the housing may include a fitting element (e.g., the coupling element 190) releasably coupled to a ring type fitting frame (e.g., a UNO fitter) connected to the lamp shade 140. In some implementations, the fitting element may be a mushroom coupler to releasably lock the ring type fitting frame in a fixed position.

Figure 2:
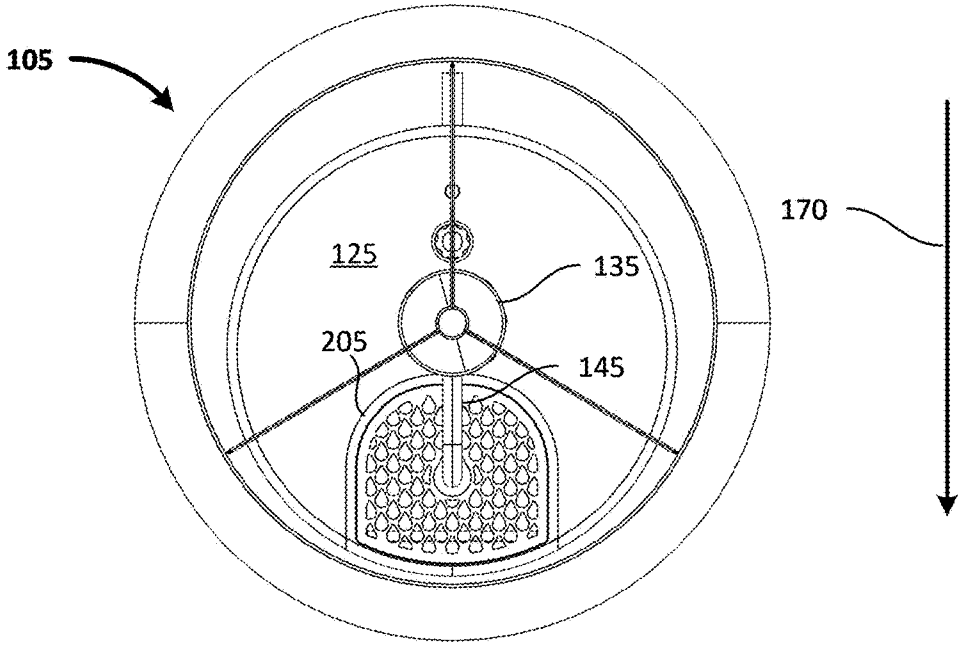
FIG. 2 depicts a top view of an exemplary WDL.

FIG. 2 depicts a top view of an exemplary WDL (e.g., the WDL 105). As shown, the water dispensing module 135 is supported vertically above the lamp base 125. The dispensing spout 145 is, in this example, disposed vertically above a spill tray 205. In some implementations, the water dispensing module 135 may dispense fluid out of the dispensing spout 145. The fluid, for example, may flow downwards to the spill tray 205 after leaving the dispensing spout 145.

Figure 3A:
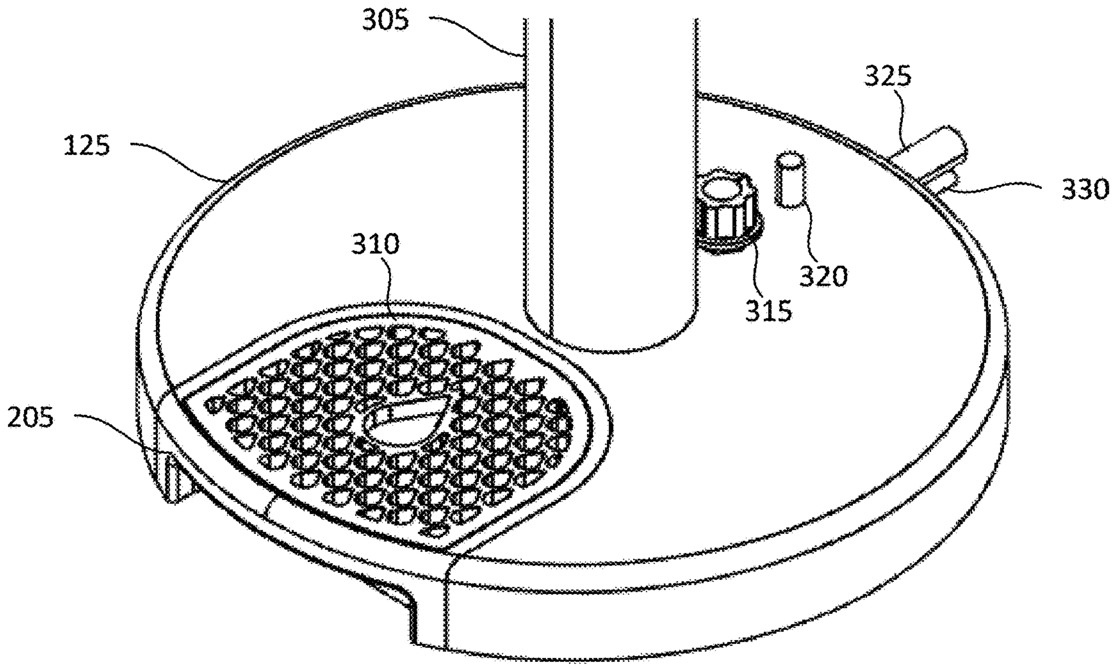
FIG. 3A and FIG. 3B depict close up views of a front side of an exemplary lamp base, with and without spill tray, respectively.
Figure 3B:
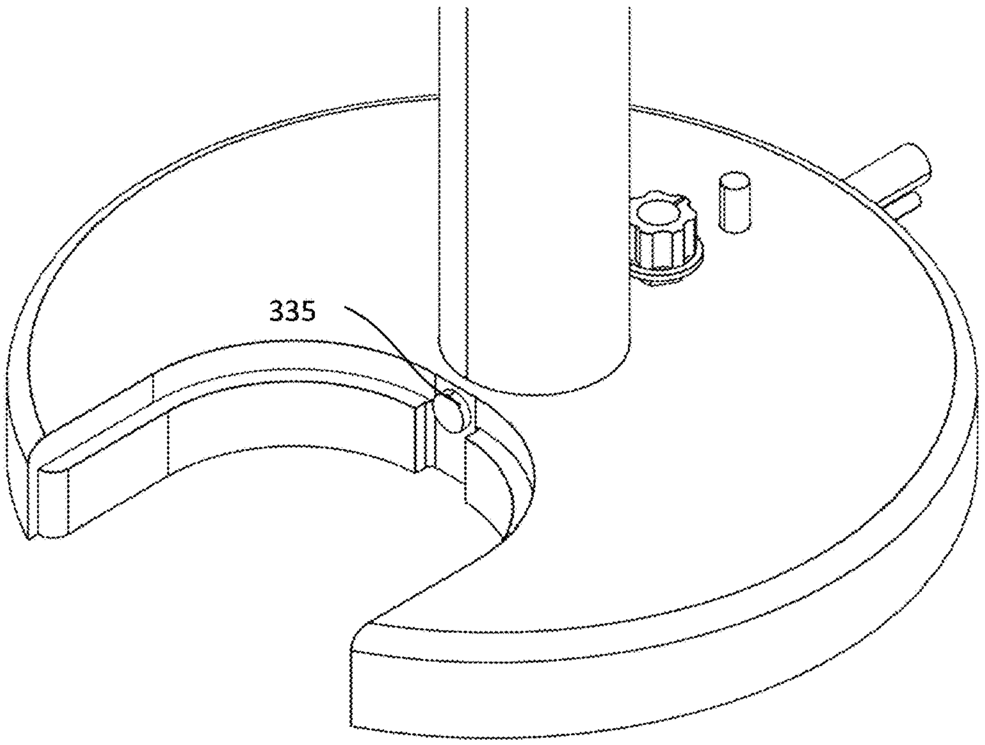

FIG. 3A and FIG. 3B depict close up views of a front side of an exemplary lamp base, with and without spill tray, respectively. As shown, the lamp base 125 is coupled to a proximal end of a lamp stem 305. For example, the lamp stem 305 may be coupled at a distal end to the water dispensing module 135. In some implementations, the lamp stem 305 may provide supporting force to the water dispensing module 135 and the lamp shade 140 above the lamp base 125.

The spill tray 205 is covered, in this example, by a grate 310. As shown, the grate 310 includes patterned apertures for spilled fluid to be collected by the spill tray 205. Various patterns of apertures may be used. For example, the pattern may be a square mesh. For example, the pattern may include vertical or horizontal slits across the grate 310.

The lamp base 125 includes a light knob 315, and a pump actuation button (PAB 320). For example, the light knob 315 may be a rotary knob that controls power and brightness of the LED module 148. The PAB 320, for example, may be a push button. For example, the electric pump 150 may be actuated when the PAB 320 is pressed. In some implementations, the PAB 320 may include a LED diode (e.g., a blue LED diode, a red LED diode). For example, the LED diode may advantageously alert a user of a water dispensing process being triggered (e.g., by providing a visual indicia).

In some implementations, the WDL 105 may include other user interfaces to control lighting function and a dispensing function of the WDL 105. For example, the lamp base 125 may include a touch screen (OLED touch screen) to control the functions. In some implementations, the lamp base 125 may include a communication module and a processor configured to receive command from a network (e.g., the Internet). For example, the processor may be configured to receive commands transmitted by a user via a smartphone, a smart watch, or other network devices. In some examples, the WDL 105 may be voice activated. In some examples, the WDL 105 may be gesture activated. In various embodiments, the user interface that drives a dispensing of water may advantageously be disguised and hidden with common table lamp features.

As shown, the lamp base 125 includes a water inlet 325 and a power inlet 330. For example, the water inlet 325 may be coupled to the water reservoir 120 via the fluid conduit 130. For example, the power inlet 330 may be coupled to a wall socket. For example, the power inlet 330 may be coupled to a battery.

As shown in FIG. 3B, the spill tray 205 is removed. The lamp base 125 includes a fastening element 335 to releasably couple the spill tray 205. For example, the fastening element 335 may be a magnetic fastener configured to couple to a housing of the spill tray 205. For example, the magnetic fastener may be configured to releasably couple to a mating fastening element of the spill tray 205.

Figure 4A:
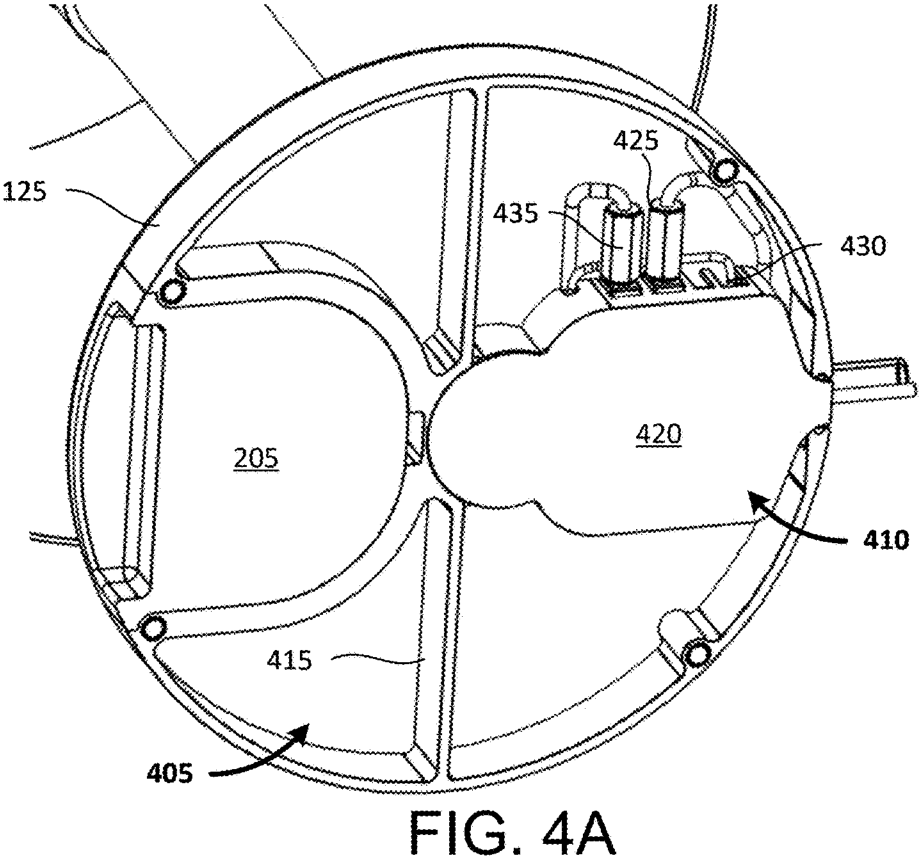
FIG. 4A depicts a bottom perspective view of an exemplary lamp base.

FIG. 4A depicts a bottom perspective view of an exemplary lamp base. In this example, the lamp base 125 includes a wet compartment 405 and a dry compartment 410 separated by a wall 415. The wet compartment 405 includes the spill tray 205 to catch fluid spilled from the dispensing process of the water dispensing module 135. For example, the dry compartment 410 may include electronic components of the WDL 105. As shown, the dry compartment 410 includes a back cover 420 to protect electronic components. For example, the back cover 420 may prevent water or other fluid from entering the dry compartment 410 receives power at an input port 425. The received power is supplied to the electric pump 150 and the LED module 148 via a power output port 430, and a power output port 435, respectively. For example, the wet compartment 405 and the dry compartment 410 may advantageously be divided with leakproof separation of the wall 415, the back cover 420 or a combination thereof.

Figure 4B:
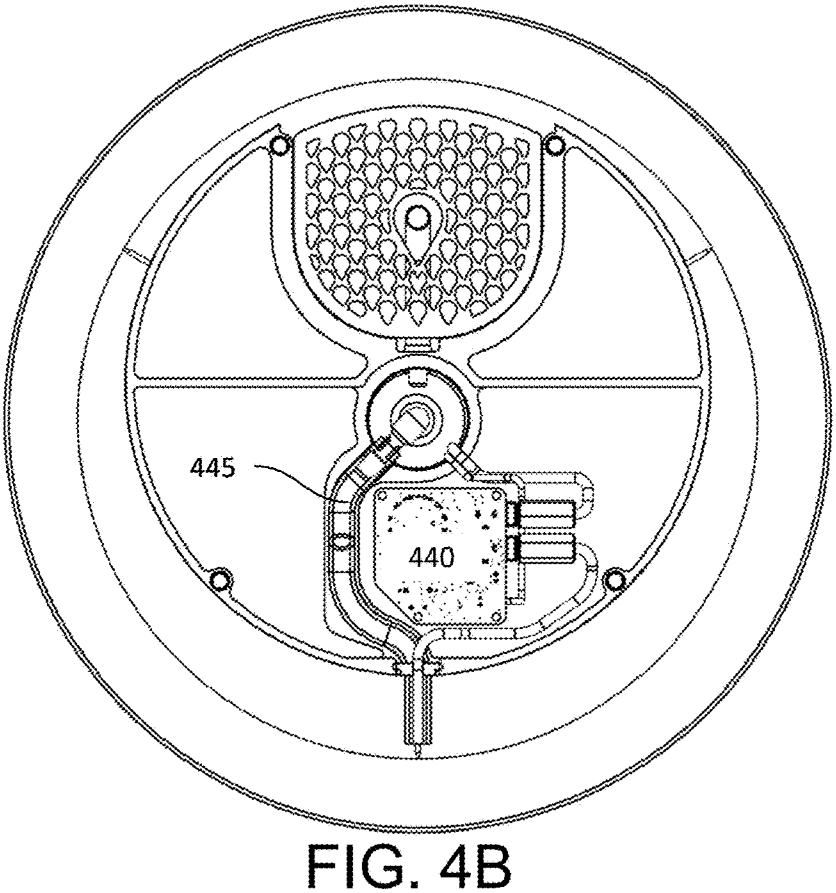
FIG. 4B depicts a bottom view of an exemplary lamp base with a back cover and a spill tray removed.

FIG. 4B depicts a bottom view of an exemplary lamp base with a back cover and a spill tray removed. As shown, the back cover 420 of the dry compartment 410 is removed. The dry compartment 410 includes an electric circuit board 440 (e.g., a printed circuit board). In some implementations, the electric circuit board 440 may include logic to control the lighting function and the water dispensing function of the WDL 105.

Separated from the electric circuit board 440, the lamp base 125 includes a fluid tubing 445 coupled to the water inlet 325. For example, the fluid tubing 445 may be coupled to the fluid conduit 155 (as described in FIG. 1A). In some embodiments, isolation of the wet compartment 405 and the dry compartment 410 may advantageously protect water-sensitive electrical components (e.g., the electric circuit board 440) in the dry compartment 410. In some embodiments, the WDL 105 may include periodic alert or sensors to remind a user to drain the spill tray 205 to advantageously avoid filling of the spill tray 205 beyond its water storage capacity.

Figure 5:
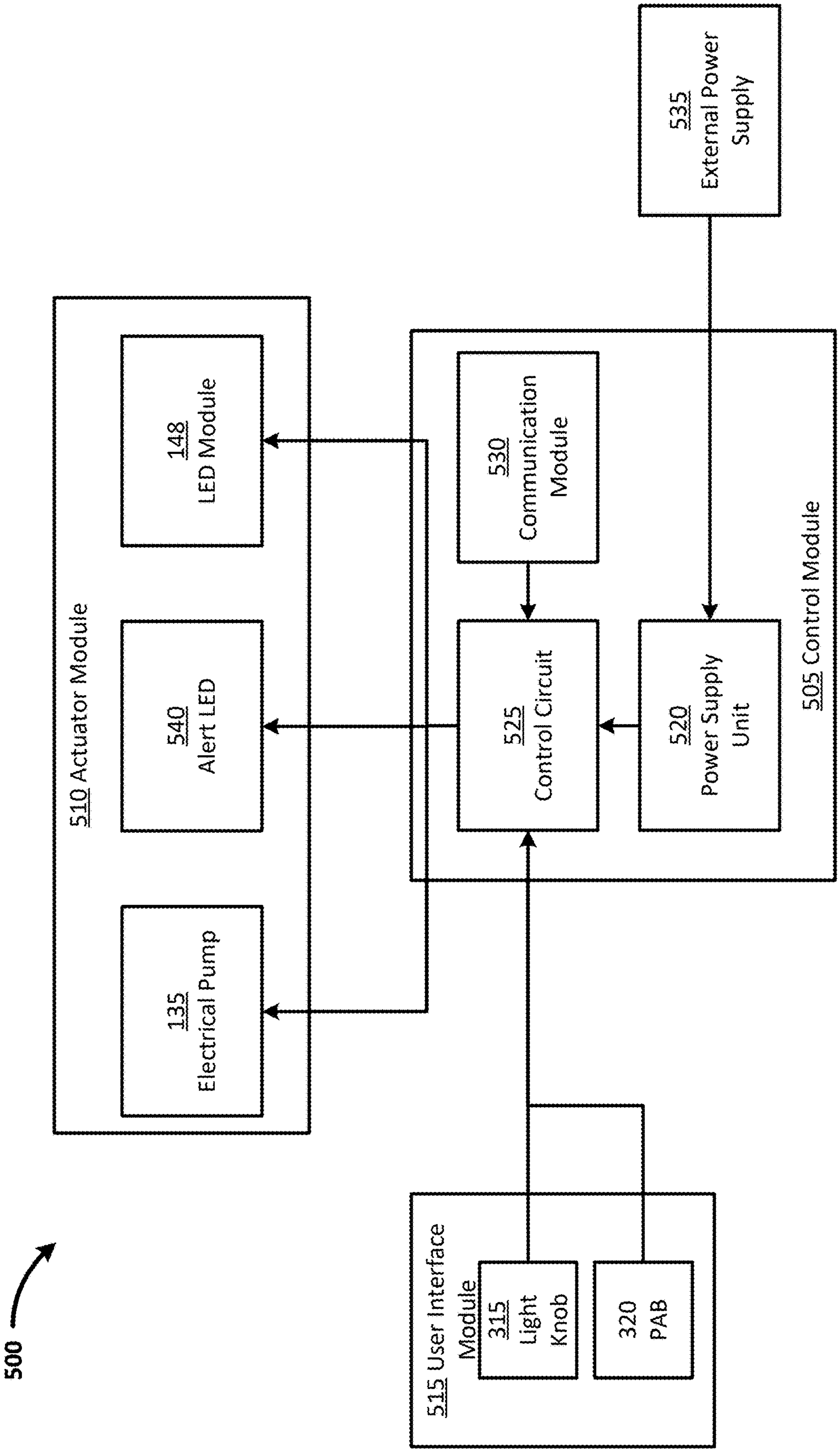
FIG. 5 is a block diagram depicting an exemplary water dispensing lamp control system (WDLCS).

FIG. 5 is a block diagram depicting an exemplary water dispensing lamp control system (WDLCS 500). The WDLCS 500 includes a control module 505, an actuator module 510, and a user interface module 515. For example, the control module 505 may be implemented on a printed circuit board (e.g., the electric circuit board 440). The control module 505 includes a power supply unit 520, a control circuit 525, and a communication module 530.

The power supply unit 520 receives power from an external power supply 535. For example, the external power supply 535 may be a wall socket power outlet. For example, the external power supply 535 may be a battery. For example, the power supply unit 520 may receive power via a USB-C input port.

The control circuit 525 may, in some implementations, include relays to control the actuator module 510. In some implementations, the control circuit 525 may include a logic circuit. For example, the control circuit 525 may receive sensor data at the spill tray 205 to determine whether a draining of the spill tray 205 is needed. In some implementations, the control circuit 525 may include a controller module to control the functions of the WDL 105. As shown, the control circuit 525 receives input from the light knob 315 and the PAB 320. In various embodiments, the user interface module 515 may include a smart interface (e.g., a graphical user interface) for receiving user instructions to control the WDL 105. In some implementations, the user interface module 515 may include a touch sensor. For example, the control circuit 525 may be configured to identify a prolonged touch of the lamp base 125 by a user as an instruction to, for example, dispense water. For example, the control circuit 525 may be configured to identify a double tap of the lamp base 125 by a user as an instruction to, for example, activate the LED module 148.

After receiving the user instructions, for example, the control circuit 525 may control the water dispensing module 135, the LED module 148, and an alert LED 540. For example, the control circuit 525 may control the alert LED 540 based on whether the water dispensing module 135 is dispensing. For example, the alert LED 540 may advantageously allow a user to see dispensing of water in a dark environment.

In this example, the control circuit 525 may also receive data from the communication module 530. In some implementations, the communication module 530 may be an input/output port. In some implementations, the communication module 530 may be a network communication module. For example, the control circuit 525 may receive firmware updates from the communication module 530. For example, the communication module 530 may receive instructions transmitted from a (wirelessly) connected network.

Figure 6A:
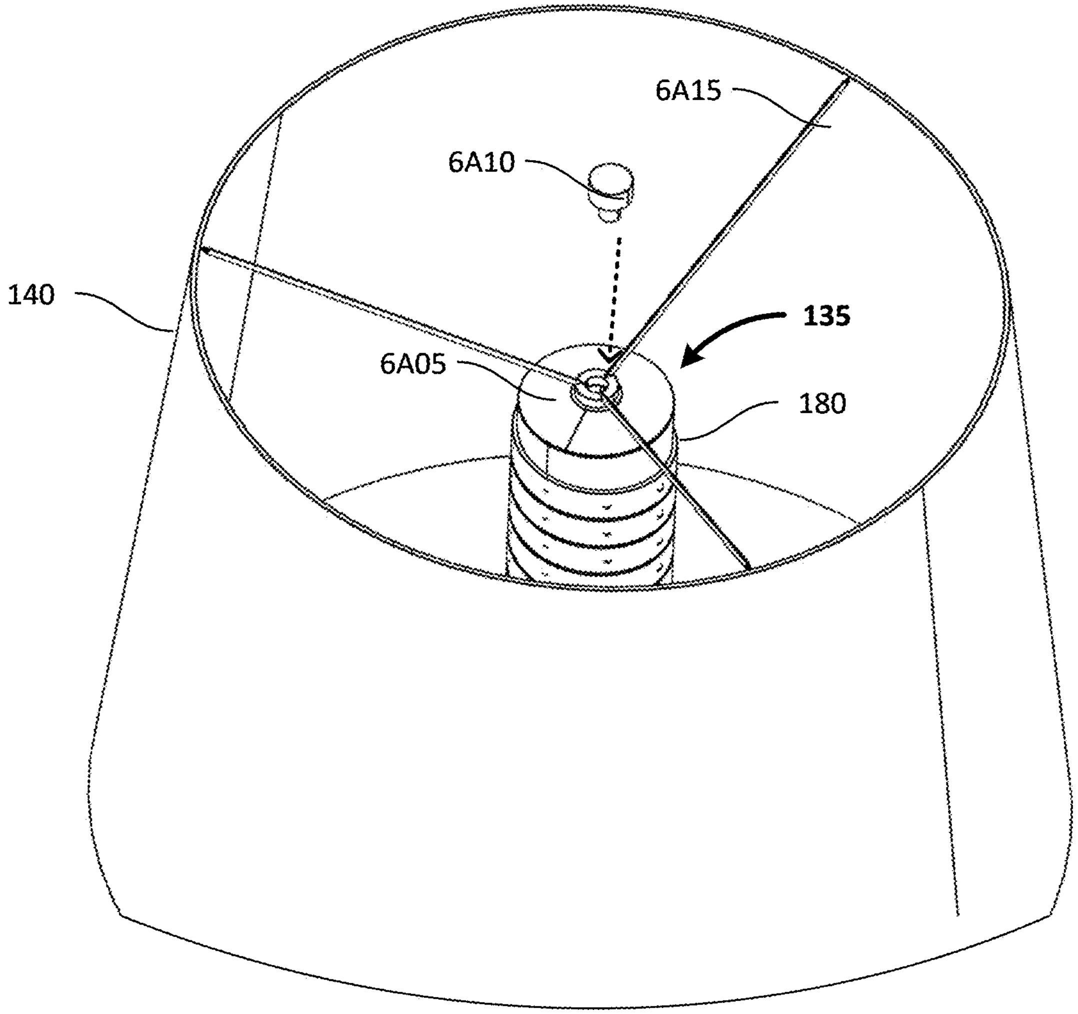
FIG. 6A depicts a top part of an exemplary water dispensing module.

FIG. 6A depicts a top part of an exemplary water dispensing module. As shown, the water dispensing module 135 includes a housing cap 605. For example, the housing cap 605 may be coupled on top of the housing 180 (as described with reference to FIG. 1B). In this example, the housing cap 605 is threadedly coupled to a mushroom cap 610. For example, the mushroom cap 610 may fasten a UNO fitting 615 of the lamp shade 140 to the housing cap 605. For example, the mushroom cap 610 may advantageously prevent wriggling of the lamp shade 140 during a dispensing process due to, for example, an actuation of the electric pump 150.

Figure 6B:
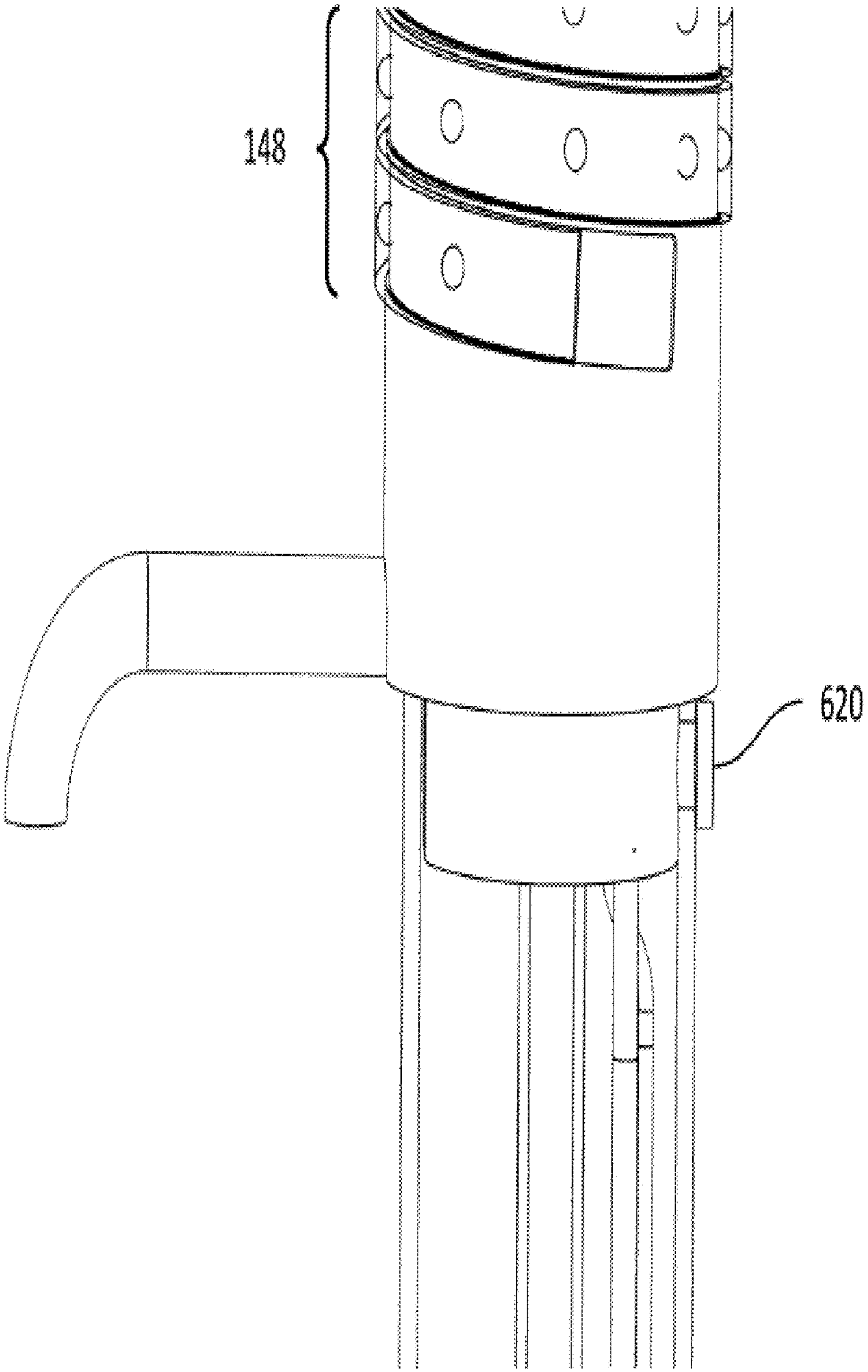
FIG. 6B depicts a side view of a bottom part of the water dispensing module described with reference to FIG. 6A.

FIG. 6B depicts a side view of a bottom part of the water dispensing module described with reference to FIG. 6A. In this example, the LED module 148 is helically wrapped around the housing 180 of the water dispensing module 135. As shown, the housing 180 entirely encloses the electric pump 150 in this example. The housing 180 and the lamp stem 305 are releasably coupled by a quick release pin 620. For example, the quick release pin 620 may be easily pulled out for a quick disassembly of the WDL 105. For example, the quick release pin 620 may advantageously allow quickly disassembly and cleaning of the WDL 105. In some implementations, the housing 180 may include an insulation layer surrounding the electric pump 150. For example, the insulation layer may advantageously reduce noise during dispensing of water from the WDL 105.

Figure 7A:
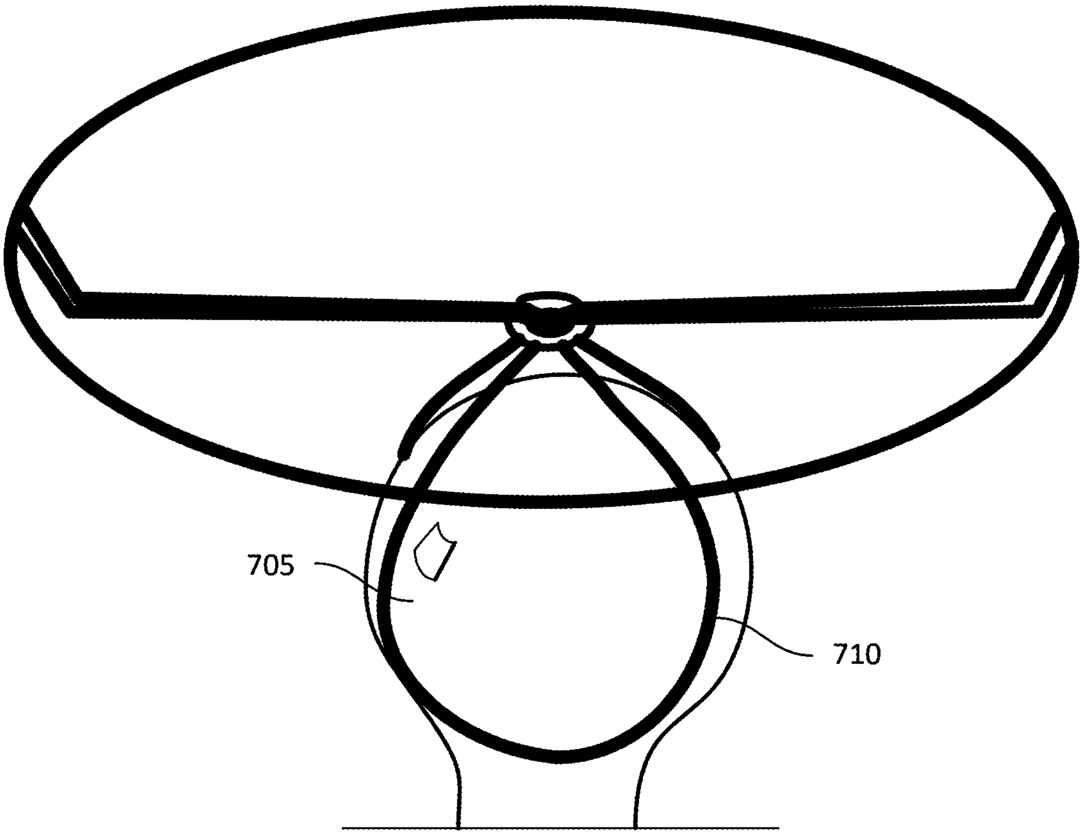
FIG. 7A and FIG. 7B depict exemplary lamp shade fitters of an exemplary WDL.
Figure 7B:
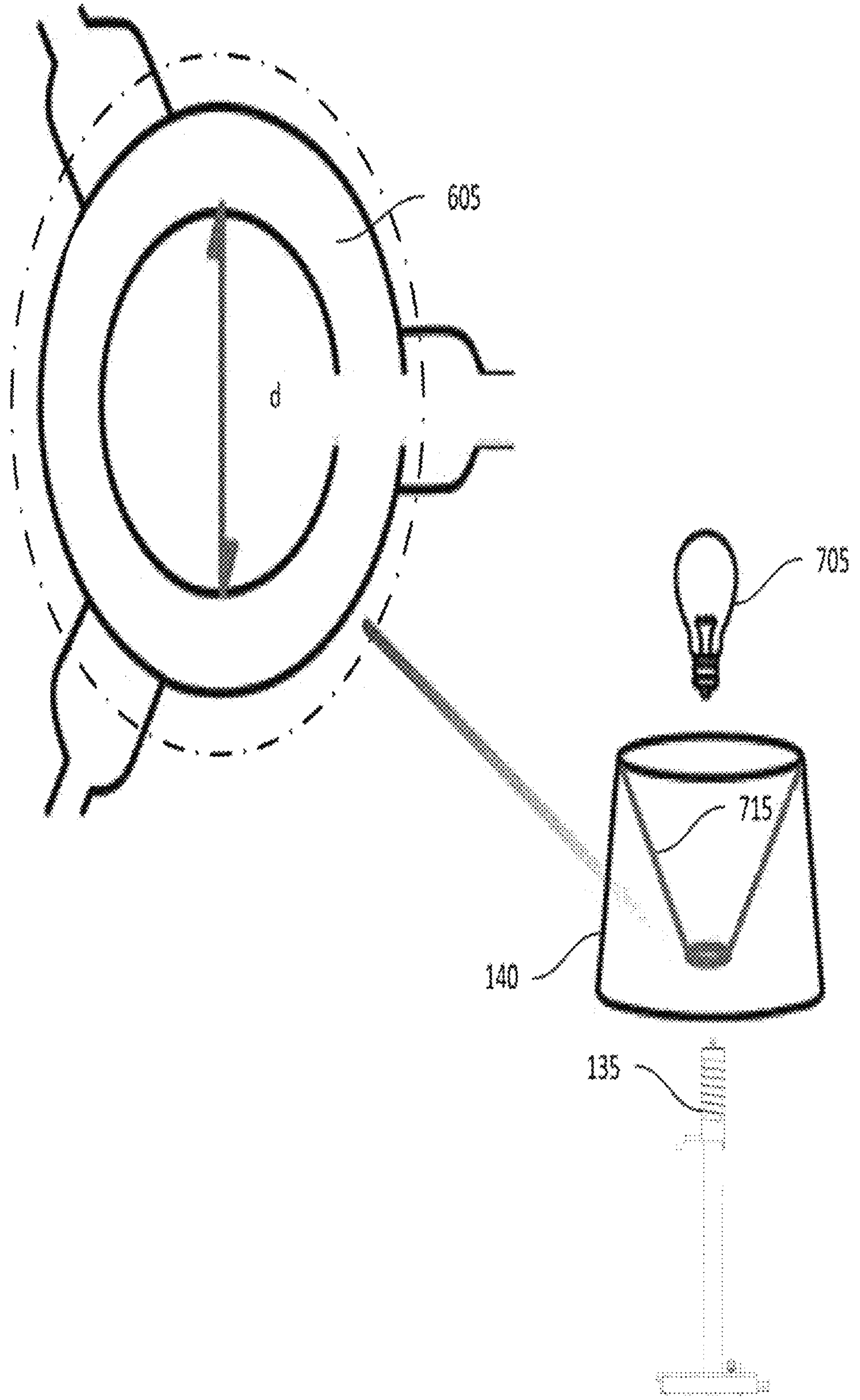

FIG. 7A and FIG. 7B depict exemplary lamp shade fitters of an exemplary WDL. In various implementations, the WDL 105 may include a light bulb to provide illumination in air space surrounding the WDL 105. As shown in FIG. 7A, a light bulb 705 (e.g., a LED light bulb, a Halogen light bulb, an incandescent light bulb, and a fluorescent light bulb) may be coupled with a lamp shade fitting 710 to the lamp shade 140. For example, the lamp shade fitting may include an Edison bulb clip. For example, the Edison bulb clip may support the lampshade by coupled to the light bulb 705.

In some embodiments, the light bulb 705 may be supported by the housing cap 605 of the water dispensing module 135. For example, the water dispensing module 135 may include a conduit to receive electrical wiring from the lamp base 125 to the housing cap 605 to supply power to the light bulb 705.

As shown in FIG. 7B, a UNO fitting 715 may be used to couple the water dispensing module 135 to the lamp shade 140. For example, the housing cap 605 may include a diameter d that fits that UNO fitting 715. For example, d may be 33 mm. For example, d may be 35 mm. For example, d may be 28 mm.

Figure 8:
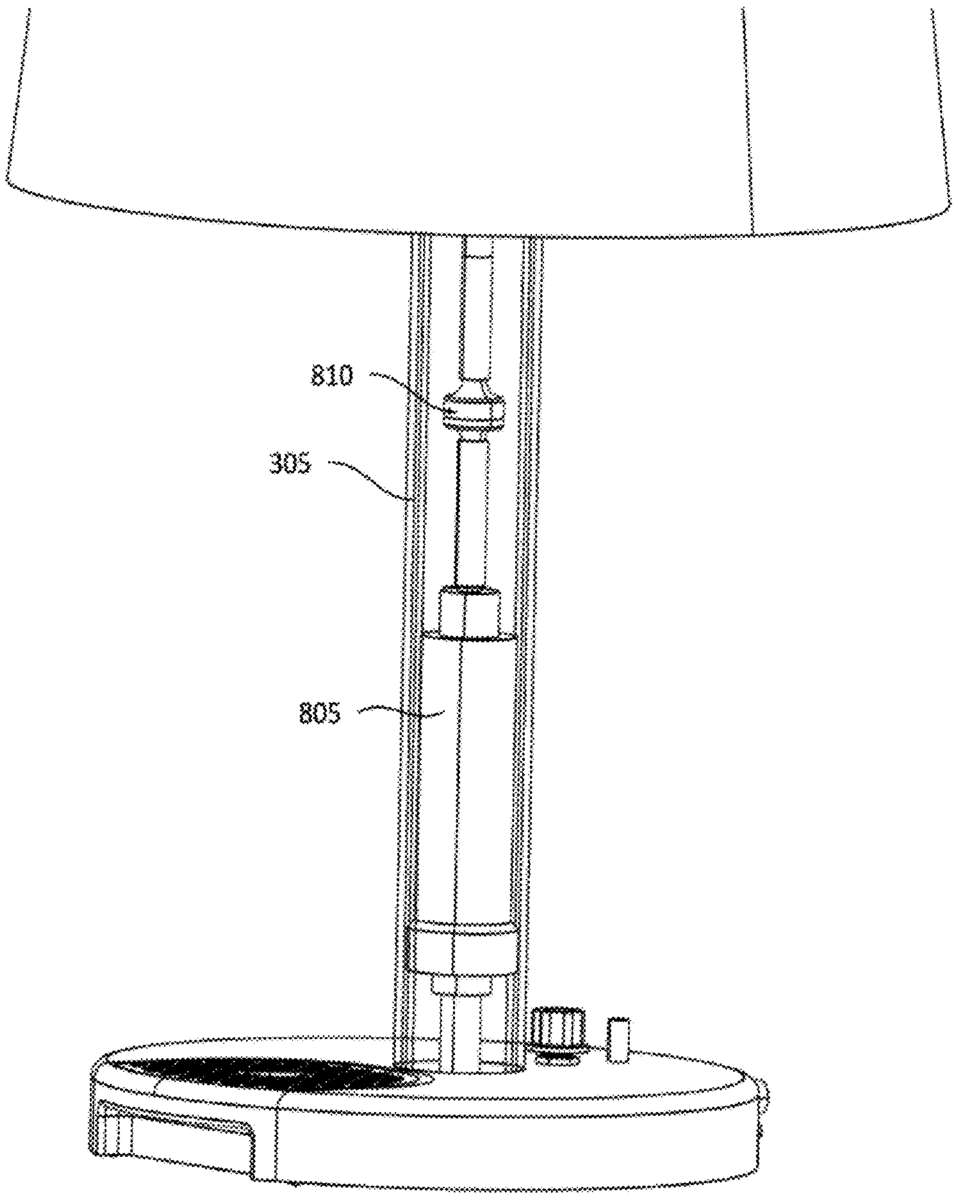
FIG. 8 depicts an exemplary water filter of an exemplary WDL.

FIG. 8 depicts an exemplary water filter of an exemplary WDL. In this example, the WDL 105 includes a water filter 805 within the lamp stem 305. For example, the water filter 805 may be an inline cartridge water filter coupled to the fluid tubing 445. In some implementations, the water filter 805 may include a micron cartridge filter. For example, the water filter 805 may include a sediment mesh. In some implementations, the water filter 805 may include carbon filters. In some implementations, the water filter 805 may include an ultraviolet (UV) filtration module.

The water filter 805 is coupled to an inline check valve 810. For example, the inline check valve 810 may prevent backward flow of fluid from the water dispensing module 135 back to the lamp base 125. For example, the inline check valve 810 may advantageously protect the electric circuit board 440 from being damaged by the reverse flow of fluid.

Although various embodiments have been described with reference to the figures, other embodiments are possible.

In some embodiments, the WDL 105 may include a dispensing module for dispensing water cups (e.g., paper cups or plastic cups). The dispensing module may, for example, fit disposable cups. For example, the dispensing module may be coupled to the lamp stem 305 of the WDL 105. In various implementations, the lamp shade 140 may be configured to conceal the dispensing module within a predetermined viewing angle.

Various embodiments may allow the user to independently enable or disable the LED module 148. In some embodiments, the WDL 105 may include a pull chain to selectively activate and deactivate the LED module 148.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device. The display device may, for example, include an LED (light-emitting diode) display. In some implementations, a display device may, for example, include a CRT (cathode ray tube). In some implementations, a display device may include, for example, an LCD (liquid crystal display). A display device (e.g., monitor) may, for example, be used for displaying information to the user. Some implementations may, for example, include a keyboard and/or pointing device (e.g., mouse, trackpad, trackball, joystick), such as by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a water dispensing lamp may include a base module disposed on a horizontal plane. The water dispensing lamp may include a fluid dispensing stem coupled above the horizontal plane along a vertical axis. For example, the fluid dispensing stem may include a housing, an electrical pump and a dispensing element. For example, the housing may enclose the electrical pump, and the electrical pump may be configured to pump fluid out of the dispensing element towards the base module.

For example, the water dispensing lamp may include a first lighting element coupled helically around the housing of the fluid dispensing stem. The water dispensing lamp may include, for example, a second lighting element disposed in the base module. For example, the water dispensing lamp may include a lamp shade coupled to the fluid dispensing stem such that the dispensing element may be concealed by the lamp shade unless a viewing angle between the horizontal plane and a viewing axis may be above a predetermined viewing angle larger than 75° at a distance 35 cm from a center of the base module. For example, the base module may include an electrical circuit operably coupled to a control interface.

For example, the electrical pump and the first lighting element may be independently controlled by the control interface. For example, when the electrical pump may be activated, the electrical circuit may be configured such that the second lighting element may be activated to provide a visual indicia corresponding to a fluid dispensing process.

For example, the water dispensing lamp may include a supporting stem configured to support the fluid dispensing stem vertically above the horizontal plane. For example, the supporting stem may include a filter coupled to the fluid dispensing stem.

For example, the fluid dispensing stem further may include a housing enclosing the electrical pump. For example, the housing may include a fitting element releasably coupled to a ring type fitting frame, such that the lamp shade may be releasably coupled to the fluid dispensing stem by the ring type fitting frame. For example, the fluid dispensing stem may include a coupling cap configured to releasably couple the ring type fitting frame to the fluid dispensing stem.

For example, the ring type fitting frame may include an UNO fitting.

The water dispensing lamp of claim 1. For example, the fluid dispensing stem may include a fluid portion and an electrical portion. For example, the fluid portion and the electrical portion may be separated by a leak proof structure.

For example, the base module may include a wet compartment configured to catch fluid spilled from the fluid dispensing stem. The base module may include a dry compartment comprising the electrical circuit. For example, the electrical pump receives power from the electrical circuit in the dry compartment. For example, the first lighting element may include a light emitting diode strip.

A water dispensing lamp may include a base module disposed on a horizontal plane. For example, the water dispensing lamp may include a fluid dispensing stem coupled above the horizontal plane along a vertical axis. For example, the fluid dispensing stem may include a housing, an electrical pump, and a dispensing element. For example, the electrical pump may be configured to pump fluid out of the dispensing element towards the base module.

For example, the water dispensing lamp may include lamp shade coupled to the fluid dispensing stem such that the dispensing element may be concealed by the lamp shade unless a viewing angle between the horizontal plane and a viewing axis may be above a predetermined viewing angle larger than 75° at a distance 35 cm from a center of the base module.

For example, the water dispensing lamp may include a supporting stem configured to support the fluid dispensing stem vertically above the horizontal plane. For example, the supporting stem may include a filter coupled to the fluid dispensing stem.

For example, the fluid dispensing stem further may include a housing enclosing the electrical pump. For example, the housing may include a fitting element releasably coupled to a ring type fitting frame, such that the lamp shade may be coupled to the fluid dispensing stem by the ring type fitting frame. For example, the fluid dispensing stem may include a coupling cap configured to releasably couple the ring type fitting frame to the fluid dispensing stem.

For example, the ring type fitting frame may include an UNO fitter. For example, the fluid dispensing stem may include a fluid portion and an electrical portion. For example, the fluid portion and the electrical portion may be separated by a leak proof structure.

For example, the base module may include a wet compartment configured to receive fluid spilled from the fluid dispensing stem. For example, base module may include a dry compartment comprising an electrical circuit. For example, the electrical pump receives power from the electrical circuit in the dry compartment.

For example, the water dispensing lamp may include a first lighting element coupled helically around the housing of the fluid dispensing stem. For example, the first lighting element may include a light emitting diode light bulb.

For example, the water dispensing lamp may include a second lighting element disposed in the base module. For example, the second lighting element may be configured to generate a visual indicia when fluid may be dispensing from fluid dispensing stem.

For example, the water dispensing lamp may include a control interface such that the electrical pump, the first lighting element, and the second lighting element may be controlled by the control interface.

In an illustrative aspect, a water dispensing lamp may include a base module disposed on a horizontal plane. For example, the water dispensing lamp may include a fluid dispensing stem coupled above the horizontal plane along a vertical axis. For example, the fluid dispensing stem may include a housing, an electrical pump and a dispensing element. For example, the housing encloses the electrical pump, and the electrical pump may be configured to pump fluid out of the dispensing element towards the base module.

For example, the water dispensing lamp may include a first lighting element coupled helically around the housing of the fluid dispensing stem. For example, the water dispensing lamp may include means for concealing the dispensing element such that the dispensing element may be not viewable unless a viewing angle between the horizontal plane and a viewing axis may be above a predetermined viewing angle larger than 75° at a distance 35 cm from a center of the base module.

For example, the fluid dispensing stem further may include a housing enclosing the electrical pump. For example, the housing may include a fitting element releasably coupled to a ring type fitting frame, such that the means for concealing may be coupled to the fluid dispensing stem by the ring type fitting frame. For example, the fluid dispensing stem may include a coupling cap configured to releasably couple the ring type fitting frame to the fluid dispensing stem.

For example, the base module may include a second lighting element and an electrical circuit operably coupled to a control interface. For example, the electrical pump and the first lighting element may be independently controlled by the control interface. For example, when the electrical pump may be activated, the electrical circuit may be configured such that the second lighting element may be activated to provide a visual indicia corresponding to a fluid dispensing process.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A water dispensing lamp comprising:

a base module disposed on a horizontal plane;

a fluid dispensing stem coupled above the horizontal plane along a vertical axis, wherein the fluid dispensing stem comprises a housing, an electrical pump and a dispensing element, wherein the housing encloses the electrical pump, and the electrical pump is configured to pump fluid out of the dispensing element towards the base module;

a first lighting element coupled helically around the housing of the fluid dispensing stem;

a second lighting element disposed in the base module; and, a lamp shade coupled to the fluid dispensing stem such that the dispensing element is concealed by the lamp shade unless a viewing angle between the horizontal plane and a viewing axis is above a predetermined viewing angle larger than 75° at a distance 35 cm from a center of the base module, wherein:

the base module comprises an electrical circuit operably coupled to a control interface, wherein:

the electrical pump and the first lighting element are independently controlled by the control interface, and, when the electrical pump is activated, the electrical circuit is configured such that the second lighting element is activated to provide a visual indicia corresponding to a fluid dispensing process.

2. The water dispensing lamp of claim 1, further comprising a supporting stem configured to support the fluid dispensing stem vertically above the horizontal plane, wherein the supporting stem comprises a filter coupled to the fluid dispensing stem.

3. The water dispensing lamp of claim 1, wherein the fluid dispensing stem further comprises a housing enclosing the electrical pump, wherein the housing comprises:

a fitting element releasably coupled to a ring type fitting frame, such that the lamp shade is releasably coupled to the fluid dispensing stem by the ring type fitting frame; and, a coupling cap configured to releasably couple the ring type fitting frame to the fluid dispensing stem.

4. The water dispensing lamp of claim 3, wherein the ring type fitting frame comprises an UNO fitting.

5. The water dispensing lamp of claim 1, wherein the fluid dispensing stem comprises a fluid portion and an electrical portion, wherein the fluid portion and the electrical portion are separated by a leak proof structure.

6. The water dispensing lamp of claim 1, wherein the base module comprises:

a wet compartment configured to catch fluid spilled from the fluid dispensing stem; and, a dry compartment comprising the electrical circuit, wherein the electrical pump receives power from the electrical circuit in the dry compartment.

7. The water dispensing lamp of claim 1, wherein the first lighting element comprises a light emitting diode strip.

8. A water dispensing lamp comprising:

a base module disposed on a horizontal plane;

a fluid dispensing stem coupled above the horizontal plane along a vertical axis, wherein the fluid dispensing stem comprises a housing, an electrical pump, and a dispensing element, wherein the electrical pump is configured to pump fluid out of the dispensing element towards the base module; and, a lamp shade coupled to the fluid dispensing stem such that the dispensing element is concealed by the lamp shade unless a viewing angle between the horizontal plane and a viewing axis is above a predetermined viewing angle larger than 75° at a distance 35 cm from a center of the base module.

9. The water dispensing lamp of claim 8, further comprising a supporting stem configured to support the fluid dispensing stem vertically above the horizontal plane, wherein the supporting stem comprises a filter coupled to the fluid dispensing stem.

10. The water dispensing lamp of claim 8, wherein the fluid dispensing stem further comprises a housing enclosing the electrical pump, wherein the housing comprises:

a fitting element releasably coupled to a ring type fitting frame, such that the lamp shade is coupled to the fluid dispensing stem by the ring type fitting frame; and, a coupling cap configured to releasably couple the ring type fitting frame to the fluid dispensing stem.

11. The water dispensing lamp of claim 10, wherein the ring type fitting frame comprises an UNO fitter.

12. The water dispensing lamp of claim 8, wherein the fluid dispensing stem comprises a fluid portion and an electrical portion, wherein the fluid portion and the electrical portion are separated by a leak proof structure.

13. The water dispensing lamp of claim 8, wherein the base module comprises:

a wet compartment configured to receive fluid spilled from the fluid dispensing stem; and, a dry compartment comprising an electrical circuit, wherein the electrical pump receives power from the electrical circuit in the dry compartment.

14. The water dispensing lamp of claim 8, further comprising a first lighting element coupled helically around the housing of the fluid dispensing stem.

15. The water dispensing lamp of claim 14, wherein the first lighting element comprises a light emitting diode light bulb.

16. The water dispensing lamp of claim 14, further comprising a second lighting element disposed in the base module, wherein the second lighting element is configured to generate a visual indicia when fluid is dispensing from fluid dispensing stem.

17. The water dispensing lamp of claim 16, further comprising a control interface such that the electrical pump, the first lighting element, and the second lighting element is controlled by the control interface.

18. A water dispensing lamp comprising:

a base module disposed on a horizontal plane;

a fluid dispensing stem coupled above the horizontal plane along a vertical axis, wherein the fluid dispensing stem comprises a housing, an electrical pump and a dispensing element, wherein the housing encloses the electrical pump, and the electrical pump is configured to pump fluid out of the dispensing element towards the base module;

a first lighting element coupled helically around the housing of the fluid dispensing stem; and, means for concealing the dispensing element such that the dispensing element is not viewable unless a viewing angle between the horizontal plane and a viewing axis is above a predetermined viewing angle larger than 75° at a distance 35 cm from a center of the base module.

19. The water dispensing lamp of claim 18, wherein the fluid dispensing stem further comprises a housing enclosing the electrical pump, wherein the housing comprises:

a fitting element releasably coupled to a ring type fitting frame, such that the means for concealing is coupled to the fluid dispensing stem by the ring type fitting frame; and, a coupling cap configured to releasably couple the ring type fitting frame to the fluid dispensing stem.

20. The water dispensing lamp of claim 18, wherein the base module comprises a second lighting element and an electrical circuit operably coupled to a control interface, wherein:

the electrical pump and the first lighting element are independently controlled by the control interface, and, when the electrical pump is activated, the electrical circuit is configured such that the second lighting element is activated to provide a visual indicia corresponding to a fluid dispensing process.

* * * * *